United States Patent Office 3,124,470
Patented Mar. 10, 1964

3,124,470
GRADE GLASS
Edwin P. Arthur, Fullerton, Calif., assignor to Beckman Instruments, Inc., a corporation of California
No Drawing. Filed Jan. 16, 1961, Ser. No. 82,695
2 Claims. (Cl. 106—52)

This invention relates to a new grade glass for use in graded seals in electrochemical electrodes and the like.

Glass electrodes for ion potential measurements, such as pH measurement, are customarily formed by blowing a bulb or membrane of one type of glass on a tubular stem of another type of glass. A typical process for forming a glass electrode is described in the U.S. patent to Cary and Baxter, No. 2,346,470. The compositions of the stem glass and sensitive bulb glass are each selected for specific mechanical and electrical characteristics. The sensitive bulb glass will have a relatively low electrical resistance in aqueous media and will be responsive to certain types of ions. The stem glass will have a relatively high resistance and will be more or less insensitive to all types of ions. Also, the stem glass should be relatively inexpensive and commercially available in quantity. Stem glass ordinarily is mass produced by machine drawing.

The stem glasses most commonly used today are potash lead silicates having a coefficient of thermal expansion in the order of $90 \times 10^{-7}$. In contrast, the compositions used for the ion sensitive bulb membranes have coefficients of thermal expansion in the order of $100 \times 10^{-7}$ and above. This divergence of characteristics causes difficulty in producing good seals between the sensitive bulb and stem and the useful life of electrodes is then limited by cracks which ultimately develop at the seal.

One solution to this problem has been the use of a third glass to produce a graded seal between the stem glass and sensitive glass, this glass ordinarily being referred to as a grade glass. Typically, the grade glass may comprise a mixture of stem glass and bulb glass. A bulb of grade glass may be blown on the stem in the usual manner, after which the "grade" bulb is ground away leaving only a few millimeters of grade glass as a collar on the end of the stem. Then another bulb of ion sensitive glass is blown on the collar, producing a glass electrode with the grade glass between the sensitive glass and stem glass.

It is an object of the present invention to provide a new composition for a grade glass for use in a graded seal. A grade glass should melt easily and have a long working range. The grade glass should be free from lead and other heavy metals to prevent contamination of the sensitive glass. The grade glass should be stable and reworkable without any devitrification. A very important characteristic of the grade glass is its electrical resistance, which should be extremely high. A second very important characteristic is its coefficient of expansion, which should be carefully controlled and fall within the range of 96 to $99 \times 10^{-7}$. It is a specific object of the invention to provide a new glass which will have the above desired characteristics.

It has been found that a lanthanide silicate glass containing titanium dioxide, calcium oxide and the oxides of three alkali metals can be produced to have these desirable characteristics. The preferred composition of the grade glass of the invention in mole percent is silica about 68 percent, titanium dioxide about 4 percent, calcium oxide about 12.2 percent, lithia about 0.7 percent, soda about 10.5 percent, potassium oxide about 2 percent and lanthanum oxide about 2.6 percent. In percent by weight, this composition is $SiO_2$ 59.7, $TiO_2$ 4.1, CaO 11, $Li_2$ 0.3, $Na_2O$ 9.7, $K_2O$ 2.8, $La_2O_3$ 12.4.

A grade glass of the preferred composition set out above has an electrical resistance as much as 100,000 times that of an ion sensitive glass and a temperature coefficient of expansion of $98 \times 10^{-7}$, which is near an ideal value for matching the commercial stem and sensitive glasses. The high electrical resistance and freedom from heavy metals, like lead, provide this grade glass with a very sharp line of demarcation at the stem and substantially electrochemically isolate the sensitive bulb from the stem.

The grade glass of the invention is made by conventional glass-making techniques and a suitable prefusion mixture to produce the preferred composition would be, in weight proportions: silica sand 11.6, titanium dioxide 0.8, calcium hydroxide 2.8, lithium carbonate 1.5, sodium carbonate 3.2, potassium carbonate 0.9, and lanthanum oxide 2.4. This mixture produces a glass that is readily melted and refined at conventional temperatures, and moreover is easily worked and remelted. The glass is stable with no tendency to devitrification in normal routine of glass fabrication.

While the preferred composition is given above, it should be noted that the proportions may be varied somewhat without adversely affecting the characteristics of the grade glass and that a coefficient of expansion in the range of about 96 to $99 \times 10^{-7}$ is suitable for a grade glass. The silica content of the finished glass may be varied in the range of 55 to 75 percent by weight while still producing a useable glass.

The temperature coefficient factors for determining the effect of varying the actual quantity of the different constituents on the coefficient of expansion is set out in Table I.

Table I

| Component: | Temperature coefficient factor (for weight percent) |
|---|---|
| $SiO_2$ | $0.05 \times 10^{-7}$ |
| $TiO_2$ | $0.50 \times 10^{-7}$ |
| CaO | $1.63 \times 10^{-7}$ |
| $Li_2O$ | $6.56 \times 10^{-7}$ |
| $Na_2O$ | $4.32 \times 10^{-7}$ |
| $K_2O$ | $3.90 \times 10^{-7}$ |
| $La_2O_3$ | $1.62 \times 10^{-7}$ |

The factors indicate the effect of varying each constituent on the coefficient of expansion and provide a guide as to how the preferred composition may be varied while still achieving the desired characteristics. In use, the temperature coefficient factor for each component is multiplied by the weight percent figure for the component and the resulting products are added to provide the temperature coefficient of expansion. The result of such a calculation for the preferred composition is $97.945 \times 10^{-7}$ which corresponds with the measured coefficient of $98 \times 10^{-7}$.

The word "essentially" is used in the specification and claims hereof because of the near impossibility of obtaining completely pure constituents. Also, of course, small amounts of colors or fluxes, which ordinarily volatilize out of the molten melt, may be used. It is understood that variations of the specific figures disclosed and discussed herein may be made without necessarily departing from the spirit of the invention.

I claim as my invention:
1. A lead-free silicate glass having a coefficient of expansion between about 96 and $99 \times 10^{-7}$ and consisting essentially of in mole percent, silica about 68 percent, titanium dioxide about 4 percent, calcium oxide about 12.2 percent, lithia about 0.7 percent, soda about 10.5 percent, potassium oxide about 2 percent, and lanthanum oxide about 2.6 percent.

2. A lead-free lanthanum silicate glass having a coefficient of expansion of about 96 to $99 \times 10^{-7}$ and being produced from a prefusion mixture consisting essentially, in parts by weight, of silica about 11.6, titanium dioxide about 0.8, calcium hydroxide about 2.8, lithium carbonate about 1.5, sodium carbonate about 3.2, potassium carbonate about 0.9, and lanthanum oxide about 2.4.

References Cited in the file of this patent

UNITED STATES PATENTS

| | | |
|---|---|---|
| 2,552,125 | Tillyer | May 8, 1951 |
| 2,668,143 | Gilbert | Feb. 2, 1954 |
| 2,859,138 | Blanchard | Nov. 4, 1958 |
| 3,032,429 | Arthur | May 1, 1962 |